United States Patent [19]

Angelié et al.

[11] Patent Number: 4,505,791

[45] Date of Patent: Mar. 19, 1985

[54] ISOTOPIC SEPARATION PROCESS

[75] Inventors: Christian Angelié, Orsay; Michel Cauchetier, Rambouillet; Jacques Paris, Bures sur Yvette, all of France

[73] Assignee: Commissariat a l'Energie Atomigue, Paris, France

[21] Appl. No.: 408,945

[22] Filed: Aug. 17, 1982

[30] Foreign Application Priority Data

Aug. 28, 1981 [FR] France .................. 81 16423

[51] Int. Cl.³ .................. B01D 59/00
[52] U.S. Cl. .................. 204/157.1 R
[58] Field of Search .......... 204/157.1 R; 250/423 P

[56] References Cited

U.S. PATENT DOCUMENTS 4,399,011 8/1983 Hsu et al. .................. 204/163 R

Primary Examiner—Deborah L. Kyle
Attorney, Agent, or Firm—Dennis P. Clarke

[57] ABSTRACT

The invention relates to an isotopic separation process. This process consists of exciting molecules A by the absorption of a pulsed light beam, then exciting molecules X present in several isotopic forms up to their dissociation by a vibrational transfer between molecules A and X. Molecules A have a dissociation energy higher than that of molecules X. The duration and energy of the light pulses are such that the absorption time by molecules A is below the excitation time of molecules X. The temperature conditions are such that the thermal width of the vibration lines is at least close to the isotopic shift between the resonance lines of the two isotopic forms.

9 Claims, 9 Drawing Figures

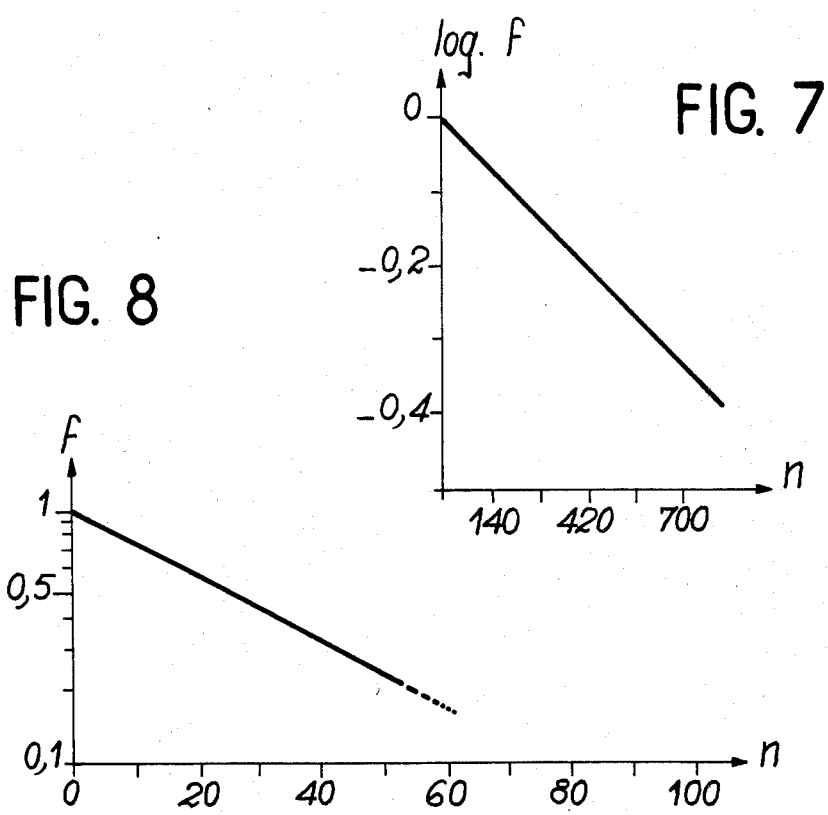
FIG. 7
FIG. 8
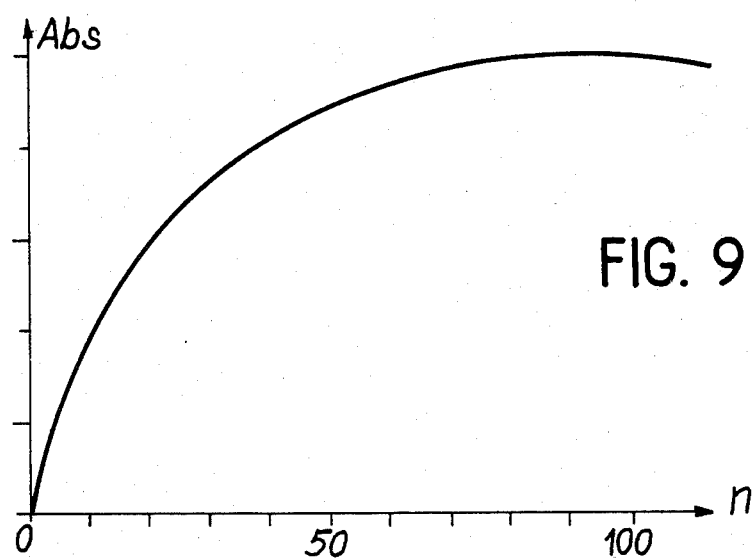
FIG. 9

ISOTOPIC SEPARATION PROCESS

BACKGROUND OF THE INVENTION

The present invention relates to a process for isotopic separation by vibrational transfer observed on sulphur, but also applicable in principle to any other separation of isotopes with a varying degree of effectiveness, e.g. isotopes of hydrogen, boron, carbon, lithium, xenon, plutonium, uranium, etc.

At present, several isotopic separation processes are known. One of these processes is based on the multiphoton effect, which will briefly be described. The multiphoton effect consists of the absorption by the vibrations of a molecule of the light energy emitted by a light source by the successive absorption of several photons until the molecule is dissociated. In such an effect, the molecule is a priori isolated from the other molecules and dissociation takes place for a relatively short and relatively high energy light source, i.e. in a time less than the collision time between molecules.

This effect causes difficult interpretation problems. In particular, it is necessary to understand how photons of the same energy can be absorbed by transitions, whose energy variation decreases on climbing the vibrational levels of a molecule. The phenomen is usually described by considering that the first vibrational levels are discrete and well separated from one another and that their light absorption has a narrow frequency resonance. The higher levels are much denser forming a quasi-continuum and their light absorption has a wider resonance band.

Isotopic selectivity by the multiphoton effect has been described in a first article by R. V. AMBARTZUMIAN, V. S. LETOKOV, E. A. RAYABOV, N. V. CHEKALIN, which appeared in JEPT lett, 1974, Vol. 21, pp. 171-173, and in a second article by J. L. LYMAN, R. J. JENSEN, J. RINK, C. P. ROBINSON, S. D. ROCKWOOD which appeared in Appl. Phys. Lett., 1975, Vol. 27, pp. 87-89.

Isotopic selectivity is explained by the fact that the first energy levels of the molecule have narrow resonance band widths, which can be less than the displacement of the vibrational energy levels of the two isotopes of the molecule in question. For example, for the sulphur hexafluoride molecule of formula $SF_6$, the isotopic shift between the isotopic varieties $^{32}SF_6$ and $^{34}SF_6$ is 17.5 $cm^{-1}$ (948.0 $cm^{-1}$ for the third mode of $^{32}SF_6$ and 930.5 $cm^{-1}$ for the third mode of $^{34}SF_6$).

Unfortunately, the use of this multiphoton effect for the isotopes of a given atom presupposes that a molecule is available which contains this atom and is able to absorb the frequency of a power light source. In the infrared region of vibrational energy levels, only the carbon dioxide laser is able to supply intense light pulses around 940 $cm^{-1}$, which considerably limits the isotopic separation possibilities. Thus, even if it is possible to separate the isotopic varieties $^{32}SF_6$ and $^{34}SF_6$ by the multiphoton effect by using such a light source, at present no intense light source is available for molecules having a resonant frequency below 800 $cm^{-1}$.

BRIEF SUMMARY OF THE INVENTION

The present invention relates to a process for isotopic separation by vibrational energy transfer, which makes it possible to obviate these disadvantages. This process in particular makes it possible to use the energy of an existing light source for bringing about an isotopic enrichment of a compound for which at present there is no light source able to excite it.

More specifically, the present invention relates to a process for the isotopic separation of a compound X having at least two isotopic forms, wherein the molecules of compound X are excited in the gaseous state, so as to bring about their dissociation, by means of a vibrational energy transfer between the molecules of compound X and the excited molecules of a compound A, in the gaseous state and having a dissociation energy higher than that of compound X, the vibrational transfer kinetics being different for the two isotopic forms considered under temperature conditions such that the thermal width of the vibrational energy levels involved in the vibrational energy transfer is at the most close to the isotopic shift between the resonance energy levels of the two isotopic forms considered, and wherein the molecules of compound A are excited by an absorption of light emitted by a pulsed light source, the duration, energy of the light pulses and irradiated section being such that the absorption time of the light by the molecules of the compound A is less than the excitation time of the molecules of compound X up to their dissociation.

The realisation of the process may require cooling in order to satisfy the thermal width condition of the vibrational energy levels. This cooling may either be obtained directly on a cell, or in the case of certain compounds, may necessitate a molecular jet. The products may either be contained in a closed cell (static state) or traverse the cell (dynamic state) and are then recovered in a continuous manner.

This process obviates the disadvantages of the direct multiphoton process, because the excitation of the molecules of compound X takes place in a selective manner by a vibrational transfer between compound X and another compound A, whose molecules can be excited by the absorption of light energy supplied by an existing light source. It should be noted that this cannot take place without the dissociation of A unless the dissociation energy of compound A is higher than that of compound X. The light absorption by compound A takes place by the multiphoton effect.

According to a preferred embodiment of the invention, the light source is a pulsed laser, which can, for example, be a carbon dioxide laser.

According to another preferred embodiment of the invention, compound A is chosen from the group containing sulphur hexafluoride, silicon tetrafluoride, boron trichloride and any other molecule with a high dissociation energy absorbing the energy levels of the carbon dioxide laser.

According to another preferred embodiment of the invention, the molecular densities are below $2.10^{17}$ molecules/$cm^3$, i.e. approximately 750 Pascals at 300° K.

According to another preferred embodiment of the invention, the duration of the light pulses at mid-height is below 500 nanoseconds.

According to another preferred embodiment of the invention, the dissociation of compound X is increased by mixing with the latter a compound B, such as hydrogen or any other compound able to intercept free atoms or radicals from X and able to prevent secondary reactions.

BRIEF DESCRIPTIONS OF THE DRAWINGS

The invention is described in greater detail hereinafter relative to non-limitative embodiments and with reference to the attached drawings, wherein show:

FIG. 1 diagrammatically, a device for performing the process according to the invention.

FIG. 2 the dissociation of sulphur chloropentafluoride, which is illustrated by the relative variations of the partial pressures as a function of the number of light pulses n.

FIG. 3 the decomposition kinetics of sulphur chloropentafluoride, which are illustrated by the variations of the remaining fraction f of this compound as a function of the number n of light pulses.

FIGS. 4 and 5 the variation of the isotopic selectivity of isotopes $^{33}S$ and $^{32}S$, i.e. of the coefficient $1/\alpha_{33/32}$ and the dissociation level $\delta$ of sulphur chloropentafluoride as a function of its initial pressure P expressed in millitorr for FIG. 4 and as a function of the energy W expressed in Joules for FIG. 5.

FIG. 6 the isotopic selectivity between forms $^{34}SF_5Cl$ and $^{32}SF_5Cl$ representing the variations of coefficient $1/\alpha_{34/32}$ as a function of coefficient $1/\alpha_{33/32}$.

FIGS. 7 and 8 the xenon oxytetrafluoride dissociation curve giving the remaining fraction f of this compound as a function of the number n of light pulses. FIG. 7 representing the dissociation of this compound by the multiphoton effect and FIG. 8 by the process according to the invention.

FIG. 9 the absorptivity Abs of xenon tetrafluoride obtained by dissociation of xenon oxytetrafluoride, as a function of the number n of light pulses.

DETAILED DESCRIPTION OF THE PREFERRED EMBODIMENTS

Figure 1:
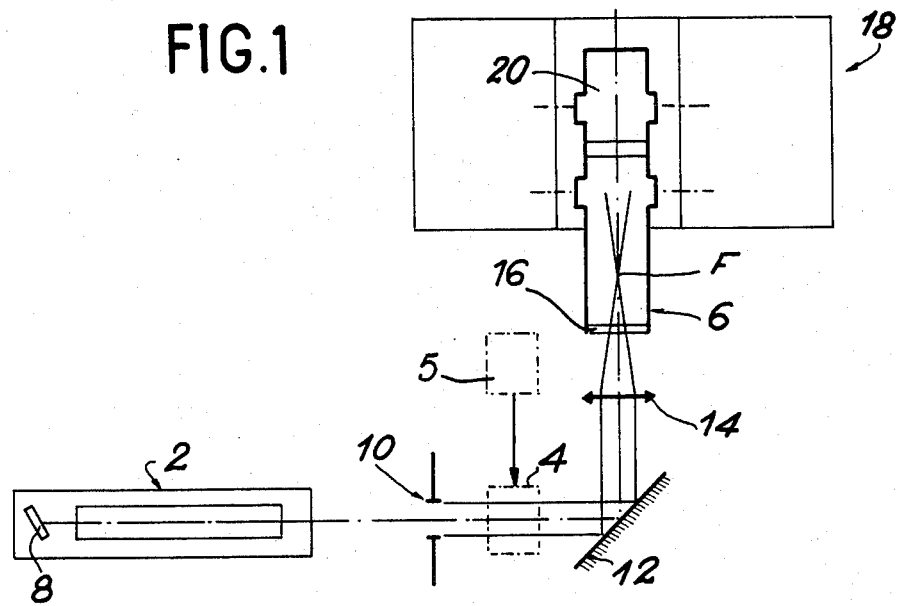

The dissociation of a molecule X by vibrational transfer with a molecule A previously excited by a laser has formed the subject matter of several studies, which have not however dealt with isotopic selectivity (R. S. KARVE et al. Chem. Phys. Lett. Vol. 78, No. 2, pp. 273-276).

According to the invention, the isotopic separation process consists of the absorption by the molecules of a compound A of a pulsed light beam having a given optical frequency and emitted by a pulsed light source. By intercepting the energy supplied by the pulsed light beam, these molecules are brought into an excited state. They are then able to excite the molecules of a compound X having at least two isotopic forms $X_1$ and $X_2$ by a vibrational transfer up to a high energy level leading to the dissociation of the molecules of compound X.

The dissociation of the molecules of compound X, by means of a vibrational transfer with the molecules of a compound A, excited up to a high energy level, cannot take place without dissociating in particular A, unless the dissociation energy of the molecules of compound A is higher than that of the molecules of compound X.

According to another variant, the molecules of compound X can be excited by vibrational transfer to a non-dissociative vibrational level. A second action, which is not necessarily isotopically selective, leads to the effective separation of the two isotopic forms or varieties (e.g. use of ultraviolet radiation, etc). In this case, the condition of dissociation energy on A may no longer be necessary.

The isotopic separation of isotopic forms of compound X is based on an isotopic selectivity in the dissociation of the molecules of said compound. This isotopic selectivity is possible when the light pulses supplied by the source are able to provide an adequate energy to molecules A to bring about the dissociation of molecules X. These light pulses must be very short, i.e. their duration must not exceed a few collisions between molecules A and X, so as to prevent the collisions between the two isotopic forms in question $X_1$ and $X_2$ leading to a deterioration of the selectivity of the vibrational transfer between the molecules of compound A and the molecules of isotopic forms $X_1$ and $X_2$.

For compounds A and X in the gaseous state having partial pressures of approximately 135 Pascals (1 torr) at a temperature of 300° K., the collision times of the molecules of compound A and the molecules of compound X are approximately 100 nanoseconds, so that light pulses are used lasting approximately 100 nanoseconds and with an energy of approximately 1 Joule, which makes it possible to obtain fluences of a few Joules/cm² necessary for the excitation of A up to a relatively high, but non-dissociative vibrational level.

Such characteristics of the light pulses can be obtained by means of a laser-type pulsed light source and in particular by using a carbon dioxide pulsed laser.

It should be noted that the use of a continuous light source leading to light energy exchanges, which are slow compared with the vibrational transfer times between the molecules of compound A and those of compound X cannot lead to an isotopic selectivity, making it necessary to use a pulsed light source.

The essential conditions for the realisation of the isotopic separation process according to the invention will now be given.

Firstly, the vibrational transfer kinetics is selective for one of the isotopic varieties under temperature conditions such that the thermal width of the vibrational energy levels, involved in the vibrational transfer, is less or at the most of the same order of magnitude as the isotopic shift between the two vibrational energy levels of the two isotopic varieties considered.

This criterion is the same as that known in isotopic separation by direct absorption of light. For example, in the case of a compound X such as sulphur chloropentafluoride of formula $SF_5Cl$, the isotopic shift is 16 cm$^{-1}$ (910 cm$^{-1}$ for the 8th mode of $^{32}SF_5Cl$, 902 cm$^{-1}$ for the 8th mode of $^{33}SF_5Cl$ and 894 cm$^{-1}$ for the 8th mode of $^{34}SF_5Cl$). At ambient temperature, this criterion is satisifed, which explains the possibility of an isotopic selectivity, by vibrational transfer.

Obviously, this only constitutes an example and the temperature satisfying this criterion can either be well above or well below ambient temperature.

Secondly, the width of the frequency band of the resonance of vibrational transfer must, at least for certain stages of this transfer, be below or approximately the same as the shift of the vibrational frequencies between A and the closest of the isotopic forms $X_1$ or $X_2$.

As vibrational transfer probably takes place in several successive transfers, as in the case of the multiphoton effect, there may only be selectivity for certain of these transfers, the most selective vibrational transfers probably taking place at low energy levels.

Moreover, and as has been stated hereinbefore, the isotopic selectivity of one of the isotopic forms of compound X is dependent on the duration of the light pulses. This also applies for the energy of these pulses. In any case, the duration and energy of these light pulses must be such that the light absorption time by the molecules of compound A is less than the average excitation time of the molecules of compound X by the molecules of compound A up to the dissociation of the molecules of compound X.

FIG. 1 shows the device for performing the process according to the invention. This device comprises a pulsed light source 2, such as a carbon dioxide laser with electronic excitation by transverse discharge and at atmospheric gas pressure, known under the abbreviation TEA $CO_2$ laser. The duration of the light pulse is formed by a peak of 100 nanoseconds, followed by a tail of 1.5 microsecond, containing half the total energy of the pulse. The energy of this pulse, which can vary around 5 Joules by action on the discharge voltage, can be measured by means of a detachable calorimeter 4. Reference 5 represents the calorimeter in the non-measuring position. The laser is used at a frequency of one pulse per second. This $CO_2$ laser produces light pulses with a frequency close to 940 $cm^{-1}$. The light frequency necessary for the excitation of the molecules of compound A, which are in the gaseous state in a stainless steel measuring cell 6, is determined by means of a grid or grating 8 and the width of the light pulse is defined by means of a diaphragm 10.

The thus defined light pulse is then reflected onto a mirror 12 and is focused onto a point F, located in measuring cell 6, by means of a convergent lens 14 having e.g. a focal length of 19 cm and in particular made from germanium. Cell 6, defined by windows such as 16, made from silver chloride has e.g. a volume of 310 $cm^3$. The cell is placed in an infrared spectrometer 18 with a double light beam transversely traversing cell 6. Spectrometer 18 also comprises a reference cell 20 permitting the dosing of compounds X and A contained in measuring cell 6. Gas samples taken at the end of the experiment make it possible to carry out an isotopic analysis of compound X using a not shown mass spectrometer.

It should be noted that the light energy within measuring cell 6 is approximately 0.6 times the energy measured with calorimeter 4, as a result of the attenuation of the latter by cell 14 and the first window 16.

Exemplified embodiments of the process according to the invention will now be described.

The first relates to the dissociation of sulphur pentafluoride of formula $SF_5Cl$ by vibrational excitation with sulphur hexafluoride of formula $SF_6$. This example illustrates the isotopic selectivity of the process according to the invention.

In a first experiment, measuring cell 6 of the device of FIG. 1 is filled with a mixture of 48.6, Pascals (0.36 torr) of $SF_6$ and 51.3 Pascals (0.38 torr) of $SF_5Cl$. The mixture is excited by $CO_2$ laser 2 focused at a frequency of 944 $cm^{-1}$, which is close to the third mode of $SF_6$, with an energy of 5.0 Joules per light pulse.

The dissociation of the sulphur chloropentafluoride is governed by the three following reactions:

$$SF_5Cl \rightleftharpoons SF_5 \cdot + Cl \cdot \qquad (1)$$

$$SF_5 \cdot \rightleftharpoons SF_4 + f \cdot \qquad (2)$$

$$F \cdot + SF_5 \cdot \leftarrow SF_6 \qquad (3)$$

It should be noted that the atoms of fluorine and chlorine disappear by formation of gaseous fluorine ($F_2$), gaseous chlorine ($Cl_2$) and chlorine fluoride (FCl).

Figure 2:
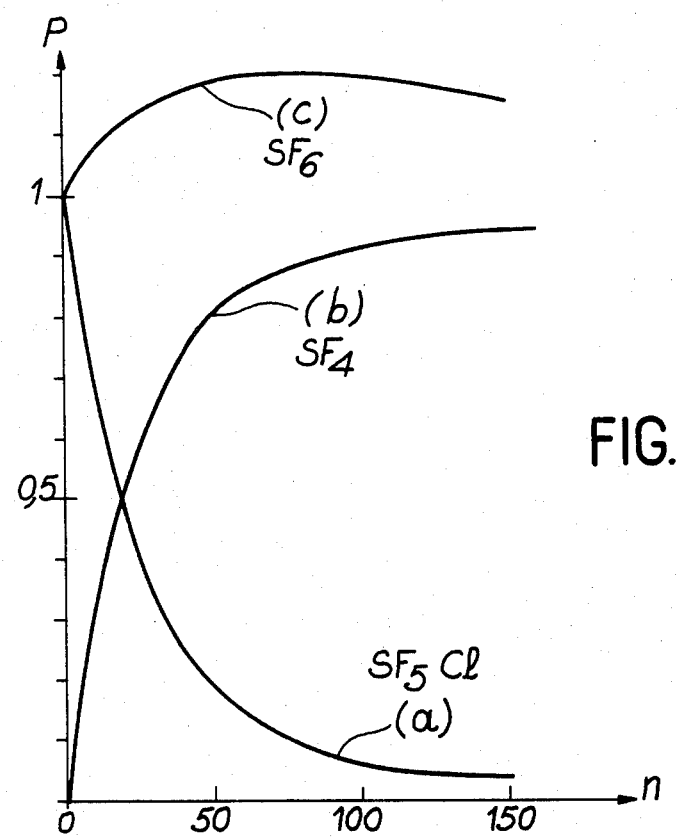

FIG. 2 shows the dissociation of sulphur chloropentafluoride, which is illustrated by the relative variations of the partial pressures as a function of the number n of light pulses. Curve a indicates the disappearance of sulphur chloropentafluoride ($SF_5Cl$). Curve b indicates the formation of sulphur tetrafluoride ($SF_4$-reaction 2) and curve c the variation of sulphur hexafluoride ($SF_6$).

FIG. 2 shows that in a first phase, the $SF_6$ quantity increases, which is explained by reaction 3 and then passes through a maximum. In the second phase, the $SF_6$ quantity decreases, being due to a multiphoton dissociation of $SF_6$, i.e. by direct irradiation, into $SF_4$ and $F_2$, which prevails over the formation of $SF_6$ by reaction 3 when $SF_5Cl$ is sufficiently dissociated.

Figure 3:
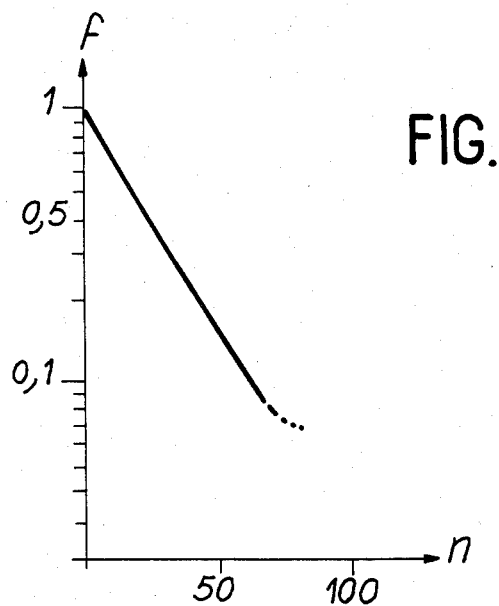

As is shown in FIG. 3, which gives the variations of the remaining fraction f of $SF_5Cl$ as a function of the number n of light pulses, the decomposition kinetics of compound $SF_5Cl$ is approximately 1 up to 90% dissociation of this compound and gives a decomposition level by light pulses of $3.27.10^{-2}$.

It should be noted that $SF_5Cl$ molecules dissociate in a negligible manner by direct irradiation, the absorption energy levels closest to $SF_5Cl$ being 909 $cm^{-1}$, whereas the light frequency emitted by the carbon dioxide laser is 944 $cm^{-1}$.

In a second experiment illustrating the isotopic selectivity, measuring cell 6 of the device of FIG. 1 is filled with a mixture of 14.85 Pascals (0.11 torr) of $SF_6$ and 14.85 Pascals of $SF_5Cl$, the sulphur contained in compound $SF_5Cl$ being present in three isotopic forms $^{32}S$, $^{33}S$, $^{34}S$. The mixture is excited by the focused $CO_2$ laser, tuned to a frequency of 944 $cm^{-1}$ with an energy of 5.1 Joules. At the end of 100 light pulses, the remaining fraction f compared with the initial concentration of isotopic form $^{32}SF_5Cl$ which is the predominant form in the initial mixture, is now only 0.53 and dissociation is accompanied by an enrichment of isotopic forms $^{32}SF_5Cl$ and $^{34}SF_5Cl$. This isotopic selectivity of the dissociation of the molecules of $SF_5Cl$ is illustrated in the following table I.

TABLE I

| Isotopic separation | $^{33}S/^{32}S$ natural | $^{34}S/^{32}S$ natural | $\beta_{33/32}$ | $\alpha_{33/32}$ | $\beta_{34/32}$ | $\alpha_{34/32}$ |
|---|---|---|---|---|---|---|
| By vibrational transfer | 0.00790 ± 0.00005 | 0.0448 ± 0.0003 | 1.09 | 0.86 | 1.15 | 0.78 |

The first column of this table indicates the fraction or percentage of $^{33}S$ compared with $^{32}S$ in the initial isotopic mixture of $SF_5Cl$, i.e. the natural ratio of $^{33}S/^{32}S$ and the second column gives the natural ratio of $^{34}S/^{32}S$ in the initial isotopic mixture.

The third column gives the parameter $\beta_{33/32}$ in accordance with equation:

$$\beta_{33/32} = \frac{(^{33}S/^{32}S) \text{ after dissociation}}{\text{initial } (^{34}S/^{32}S)}$$

The fifth column gives the parameter $\beta_{34/32}$ in accordance with the equation:

$$\beta_{34/32} = \frac{(^{34}S/^{32}S) \text{ after dissociation}}{\text{initial } (^{34}S/^{32}S)}$$

The fourth column gives the parameter $\alpha_{33/32}$ in accordance with the equation:

$$\alpha_{33/32} = 1 + \frac{\text{Ln } \beta_{33/32}}{\text{Ln } f}$$

in which f represents the remaining fraction of $^{32}SFCl$.

The sixth column gives the parameter $\alpha_{34/32}$ in accordance with equation:

$$\alpha_{34/32} = 1 + \frac{\text{Ln } \beta_{34/32}}{\text{Ln } f}$$

When the decomposition kinetics is approximately 1, parameter $\alpha_{33/32}$ is merely the ratio of the dissociation levels by light pulses of isotope $^{33}S$ compared with isotopes $^{32}S$ and consequently characterizes the kinetics difference in the dissociation of $SF_5Cl$. In the same way, parameter $\alpha_{34/32}$ represents the ratio of the dissociation levels by light pulses of isotope $^{34}S$ compared with isotope $^{32}S$.

Systematic complementary experiments were performed on the dissociation of isotopic forms of $SF_5Cl$ photosensitized by $SF_6$. These experiments revealed that isotopic selectivity is well above those previously obtained and are achievable. Firstly, the laser beam was used without focusing, which makes the irradiation much more homogeneous.

Figure 4:
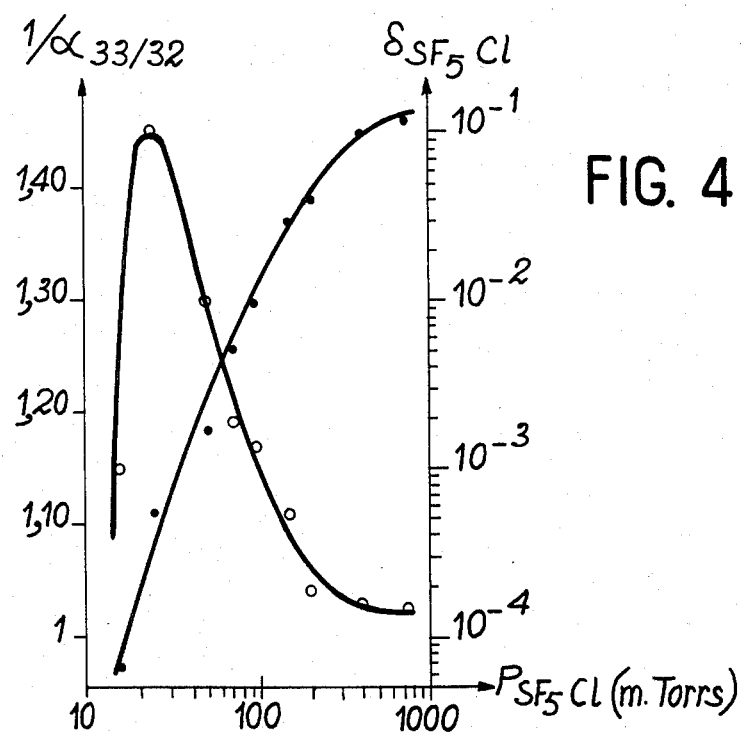
Figure 5:
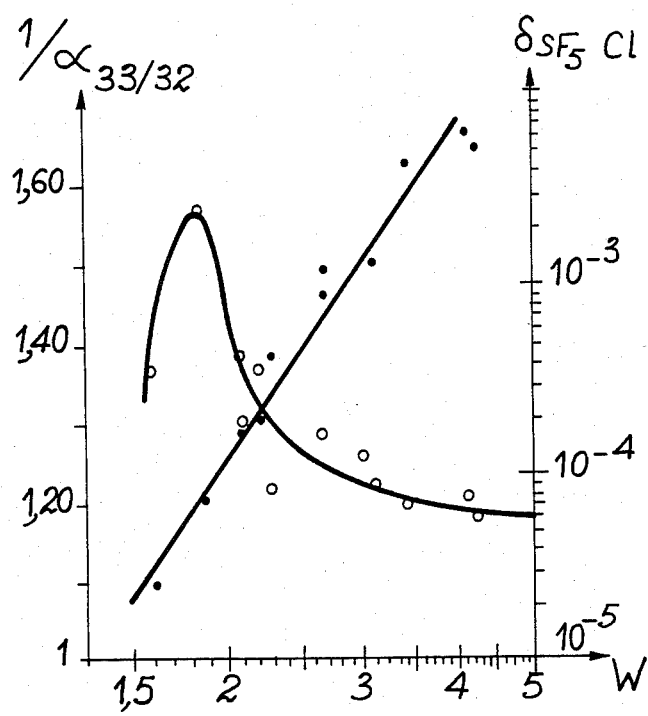

FIG. 4 shows the variation of the isotopic selectivity of isotopes $^{33}S$ and $^{32}S$ illustrated by the coefficient $1/\alpha_{33/32}$ and the dissociation level $\delta$ of $SF_5Cl$ as a function of the initial pressure P of $SF_5Cl$, expressed in millitorr, for ratios of the pressures of $SF_5/SF_6Cl$= to 2/1 and a fluence of the irradiation of approximately 2 Joules/cm². It can be seen that for 25 millitorrs (3.34 Pa) of $SF_5Cl$ and 50 millitorrs of $SF_6$ (6.8 Pa) the coefficient $1/\alpha_{33/32}$ reaches a values of 1.45. FIG. 5 shows the variation of the isotopic selectivity of isotopes $^{33}S$ and $^{32}S$ illustrated by the coefficient $1/\alpha_{33/32}$ and the dissociation level $\delta$ of $SF_5Cl$ as a function of the energy W of the laser pulse expressed in Joule (distributed over approximately 2 cm²) for a gaseous mixture constituted by 150 millitorrs of $SF_6$ (20.0 Pa) and 75 millitorrs of $SF_5Cl$ (10.0 Pa). It should be noted that at about 1.7 Joules, the coefficient $1/\alpha_{33/32}$ reaches a value of 1.57.

Figure 6:
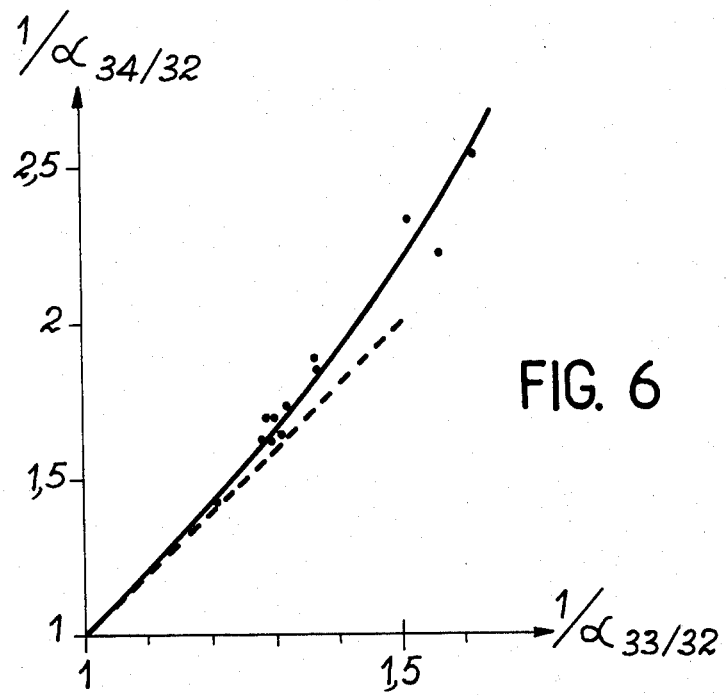

Measurements of the isotopic selectivity between forms $^{34}SF_5Cl$ and $^{32}SF_5Cl$ have also been systematically carried out. No matter what the pressure or energy conditions of the laser pulse, there was found to be a significant correlation between the isotopic selectivities of isotopes $^{34}S$ and $^{32}S$ on the one hand and $^{33}S$ and $^{32}S$ on the other hand, i.e. between coefficients $\alpha_{34/32}$ and $\alpha_{33/32}$. The relationship $\alpha_{34/32} = (\alpha_{33/32})^2$ is proved on the curve of FIG. 6 giving the variations of the coefficient $1/\alpha_{34/32}$ as a function of the coefficient $1/\alpha_{33/32}$. The maximum of the coefficients $1/\alpha_{33/32}$ reached in these experiments is 1.60 and corresponds to the maximum of coefficient $1/\alpha_{34/32}$ close to 2.55.

The isotopic selectivities of isotopes $^{34}S$ and $^{32}S$, i.e. the values of $1/\alpha_{34/32}$, are comparable with those obtained by direct multiphoton excitation of $SF_5Cl$ molecules. The results are taken from the following reference: K. M. LEARY et al. J. Chem. Phys. Vol. 68, 1978, p. 1671. The best isotopic selectivity reached in these experiments related to 0.25 torr (33.4 Pa) of $SF_5Cl$ irradiated at 905 cm$^{-1}$ and under these conditions the coefficient $1/\alpha_{34/32}$ is equal to 2.32.

Thus, the isotopic selectivity by vibrational transfer is quite competetive compared with that of direct multiphoton excitation in the case where compound X present in several isotopic forms can be dissociated either by vibrational transfer or by the multiphoton effect.

Moreover, and as has been stated hereinbefore, isotopic separation by vibrational transfer can be used much more widely than isotopic separation by the multiphoton effect.

Although the exact mechanism of the vibrational transfer is not well known, it is assumed that to be effective the vibrational transfer must be resonant. This resonance can be produced between two simple vibrations of the molecules of compound A and compound X, but can also involve harmonics of vibrations or combinations of vibrations (simultaneous energy exchange on several vibration levels of the said molecules).

Moreover, the transfer does not necessarily take place by the vibration of molecules of compound A which absorbs the light energy, because in the highest energy levels, there is an energy redistribution on all the vibrations of the molecules due to the internal couplings between the different vibration modes thereof. It is this great variety of possible transfers which makes this excitation and dissociation method so interesting and makes it possible to dissociate molecules, which cannot at present be dissociated by the direct multiphoton effect.

In the example described hereinbefore, the vibrational transfer probably takes place by "quasi-resonances" between the third mode of $SF_6$ at 948 cm$^{-1}$ and the third mode of $SF_5Cl$ and 909 cm$^{-1}$ and between the fourth mode of $SF_6$ at 615 cm$^{-1}$ and the third mode of $SF_5Cl$ at 600 cm$^{-1}$.

The second example relates to the dissociation of xenon oxytetrafluoride of formula $XeOF_4$ by excitation with sulphur hexafluoride. This example illustrates the increase in the dissociation level of a molecule by using the process of the invention, when compared with the use of the multiphoton effect.

The molecules of $XeOF_4$ have a first transition at 926 cm$^{-1}$ close to one of the emission frequencies of the $CO_2$ laser and 929 cm$^{-1}$, making it possible to carry out a direct multiphonton dissociation of $XeOF_4$ by such a laser.

In a first experiment, the measuring cell 6 of the device of FIG. 1 is filled with the gaseous compound $XeOF_4$ having a pressure of 81 Pascals (0.6 torr). This compound is excited by means of the $CO_2$ laser tuned, by means of grid 8, to 929 cm$^{-1}$. The dissociation of $XeOF_4$, followed by the infrared spectrometer 18 obeys the reaction 4:

$$XeOF_4 \rightarrow XeF_4 + \tfrac{1}{2}O_2 \qquad (4)$$

FIG. 7 shows for the first experiment, the $XeOF_4$ dissociation curve giving the remaining $XeOF_4$ fraction f as a function of the number of light pulses n for an energy of said pulses of 4.8 Joules. A dissociation level of $4.8 \cdot 10^{-4}$/light pulse is obtained.

In the second experiment, the measuring cell 6 of the device of FIG. 1 is filled with a mixture of 58.05 Pascals (0.35 torr) of XeOF$_4$ and 47.25 Pascals (0.35 torr) of SF$_6$. The mixture is irradiated with a CO$_2$ laser tuned to a frequency of 944 cm$^{-1}$ with an energy of 4.8 Joules.

For this second experiment, FIG. 8 shows the dissociation of the XeOF$_4$ molecules and gives the dissociation levels of these molecules by light pulses, which is 2.9.10$^{-2}$, i.e. the dissociation is 60 times faster than that obtained by the direct multiphoton effect (first experiment). For this molecule, this illustrates the superiority of dissociation by vibrational transfer compared with the direct multiphoton process for the same energy supplied by the laser.

It should be noted that the curve shown in FIG. 8 is perfectly linear, which represents a kinetics of 1 of reaction 4.

FIG. 9 shows the absorptivity Abs of xenon tetrafluoride of formula XeF$_4$, obtained in accordance with reaction (4), as a function of the number n light pulses, the absorptivity being expressed by arbitrary units. In FIG. 9, it can be seen that in a first phase, the XeF$_4$ quantity increases (reaction 4) and then passes through a maximum, and that in a second phase the XeF$_4$ quantity decreases. This is explained by the dissociation of XeF$_4$ into XeF$_2$ and F$_2$ by a new vibrational transfer of SF$_6$ into XeF$_4$.

The vibrational transfer of SF$_6$ onto XeOF$_5$ doubtless takes place by quasi-resonances between the third mode of SF$_6$ at 9.48 cm$^{-1}$ and the first mode of XeOF$_4$ at 926 cm$^{-1}$ and between the fourth mode of SF$_6$ at 615 cm$^{-1}$ and the seventh mode of XeOF$_4$ at 608 cm$^{-1}$.

The isotopic effect in the dissociation by vibrational transfer has also been noted on isotopic forms $^{12}$CF$_3$I and $^{13}$CF$_3$I, in the presence of SF$_6$ excited by a pulsed TEA CO$_2$ laser. As in the previous experiments, there is a negligible dissociation of SF$_6$. The chemical reactions relating to the dissociation of CF$_3$I or carbon iodotrifluoride are:

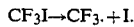
CF$_3$I→CF$_3$.+I.

CF$_3$.+CF$_3$.→C$_2$F$_6$

I.+I.→I$_2$

In all the experiments, isotopic form $^{13}$CF$_3$I dissociates in a preferred manner. The attached table II gives the results of several experiments (different pressures of SF$_6$ and CF$_3$I in the initial gaseous mixture) performed with an unfocused laser beam tuned at 942 cm$^{-1}$ and having an energy level of approximately 4.4 Joules. The table gives the dissociation level of 12CF$_3$I/pulse, $\delta$ CF$_3$I, the isotopic enrichment $\beta_{13/12}$, the isotopic selectivity of isotopes $^{13}$C and $^{12}$C represented by the coefficient $\alpha_{13/12}$, as defined hereinbefore, and finally the isotopic enrichment in the product formed C$_2$F$_6$ represented by the coefficient $\beta'_{13/12}$. This coefficient is defined by the following equation, after N laser shots:

$$\beta'_{13/12} = \frac{R_{13/12}^{(N)}(C_2F_6)}{R_{13/12}^{(O)}(CF_3I)}$$

in which R$_{13/12}^{(N)}$ (Y) is, at the end of N laser shots, the ratio between the total quantity of $^{13}$C present in Y and the total quantity of $^{12}$C present in Y.

The best value of coefficient $\alpha_{13/12}$ illustrating the isotopic selectivity of $^{13}$C and $^{12}$C obtained in the experiments in therefore 1.23.

The vibrational transfer determining the isotopic selectivity doubtless occurs between the third mode $\nu_3$ of SF$_6$ (948 cm$^{-2}$) and the first mode $\nu_1$ of CF$_3$I, which is equal to 1075 cm$^{-1}$ for $^{12}$CF$_3$I and 1047 cm$^{-1}$ for $^{13}$CF$_3$I. The dissociation energy of CF$_3$I of only 55 kcal/mole is well below that of SF$_6$.

The above experiments on CF$_3$I have shown a serious disadvantage of isotopic selectivity. Thus, the molecular iodine formed, I$_2$, tends to react with the radical CF$_3$ formed, in such a way that CF$_3$I is regenerated. In order to prevent this, a silver grid or grating is introduced into the measuring cell, like that used for the direct multiphoton dissociation of CF$_3$I. The use of this silver grid has been described in French Patent Application 2,454,836 of 27.4.1979, entitled "Process for the separation of $^{12}$C and $^{13}$C isotopes from carbon" (M. CAUCHETIER, G. FOLCER, P. SCHNURIGER).

Thus, the chemical reactions involves in the dissociation of CF$_3$I are:

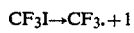
CF$_3$I→CF$_3$.+I

CF$_3$.+CF$_3$.→C$_2$F$_6$

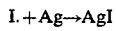
I.+Ag→AgI

The attached table III shows the variation of the dissociation level/pulse of CF$_3$I, $\delta$ CF$_3$I and the isotopic selectivity of isotopes $^{13}$C and $^{12}$C illustrated by the coefficient $\alpha_{13/12}$, as a function of the pressure of SF$_6$ and CF$_3$I for different mixtures of SF$_6$ and CF$_3$I irradiated at about 3 Joules/pulse. It can be seen that the presence of the silver grid improves the dissociation level and isotopic selectivity. In the case of SF$_6$ pressure of 250 mtorr (33.4 Pa) and a CF$_3$I pressure of 50 mtorr (6.68 Pa) in the presence of the silver grid, a $\alpha_{13/12}$ coefficient of 1.55 was obtained, which illustrates the isotopic selectivity between $^{13}$C and $^{12}$C.

This example shows that the isotopically selected dissociation of the isotopes of carbon is possible with good isotopic selectivites, when using the process according to the invention.

The process according to the invention can also be used for the isotopic separation of isotopic forms $^{10}$BBr$_3$ and $^{11}$BBr$_3$ in the presence of SF$_6$ excited by a CO$_2$ laser. Form $^{10}$BBr$_3$ has a vibration mode at 856 cm$^{-1}$ and form $^{11}$BBr$_3$ a vibration mode at 819 cm$^{-1}$. A coefficient $\alpha_{10/11}$ close to 2.0, illustrating the isotopic selectivity between $^{10}$B and $^{11}$B, can be obtained.

The process according to the invention can also be used for separating isotopies from hydrogen such as H and D, in the case of isotope forms CHBr$_3$ and CDBr$_3$ in the presence of SF$_6$. Thus, the molecules of SF$_6$ absorb the energy levels of the CO$_2$ laser about 948 cm$^{-1}$ and the isotopically selected vibrational transfer can take place as from the fourth vibration energy levels $\nu_4$ of SF$_6$ (615 cm$^{-1}$) towards the vibration energy levels of CHBr$_3$ at 669 cm$^{-1}$ and CDBr$_3$ at 632 cm$^{-1}$. A coefficient $\alpha_{D/H}$ illustrating the selectivity between H and D, between 5 and 10 can be obtained.

In the above examples, only sulphur hexafluoride (SF$_6$) has been used as the sensitizer A or as the exciting compound. However, it is obvious that other compounds with a high dissociation energy able to absorb the energy levels of the CO$_2$ laser can be used. In particular, it is possible to use boron trichloride or formula BCl$_3$. BCl$_3$ absorbs the light energy of energy levels P10 of the TEA CO$_2$ laser at 953 cm$^{-1}$. In various experiments, $BCl_3$ was irradiated in the presence of $SF_5Cl$. It was found that $BCl_3$, whose dissociation energy is 106 kcal/mole was subject to a negligible dissociation in these experiments, and that $SF_5Cl$ dissociated as in the previously described experiments. A mixture of 800 mtorr (106.6 Pa) of $BCl_3$ of $BCl_3$ and 200 mtorr (26.6 Pa) of $SF_5Cl$ irradiated at a rate of 4.3 Joules/cm² gave a coefficient $\alpha_{32/33}$ equal to 1.4 and a coefficient $\alpha_{32/34}$ equal to 2.1, illustrating the selectivities of $^{32}S$ and $^{33}S$ on the one hand and $^{32}S$ and $^{34}S$ on the other.

In the examples described hereinbefore, consideration has been given to the selective dissociation of the molecules of a compound X by vibrational transfer with molecules of a compound A using as the initial gaseous mixture, a mixture only containing compound X and compound A is the gaseous state. However, as a function of compounds A and X, the addition to this mixture of one or more compounds B may make it possible to increase the dissociation level of compound X by intercepting three atoms or radicals in accordance with a per se known process. Compound B can, for example, be hydrogen for $SF_5Cl$.

In the same way, the TEX $CO_2$ laser has been used as the exciting pulsed light source. The use of other pulsed light sources make it possible to increase the isotopic separations which can be obtained by the process of the invention. The light sources could be constituted by a CO laser, an HF laser. etc . . .

TABLE II

| $P_O(SF_6)$ (mtorr) | $P_O(CF_3I)$ (mtorr) | $\delta CF_3I$ | $\beta_{13/12}$ | $\alpha'_{13/12}$ | $\beta_{13/12}$ |
|---|---|---|---|---|---|
| 0 | 400 | a | 1 | a | 1 |
| 100 | 100 | $10^{-5}$ | 0.996 | 1.013 | 1 |
| 350 | 230 | $4.1 \times 10^{-4}$ | 0.943 | 1.101 | 1.14 |
| 200 | 100 | $1.1 \times 10^{-4}$ | 0.974 | 1.113 | 1.23 |
| 400 | 200 | $5.7 \times 10^{-4}$ | 0.931 | 1.135 | 1.17 |
| 800 | 400 | $1.1 \times 10^{-2}$ | 0.951 | 1.076 | 1.09 |

TABLE III

| $PSF_6$ (mtorr) | $PCF_3I$ (mtorr) | Without Ag | | With Ag | |
|---|---|---|---|---|---|
| | | $\delta CF_3I$ | $\alpha_{13/12}$ | $\delta CF_3I$ | $\alpha_{13/12}$ |
| 200 | 100 | $1.3\ 10^{-4}$ | 1.10 | $1.4\ 10^{-3}$ | 1.36 |
| 300 | 100 | $2.2\ 10^{-4}$ | 1.21 | $4.0\ 10^{-4}$ | 1.34 |
| 400 | 200 | $2.8\ 10^{-4}$ | 1.18 | $6.7\ 20^{-4}$ | 1.25 |
| 400 | 100 | $5.0\ 10^{-4}$ | 1.21 | $6.8\ 10^{-4}$ | 1.26 |
| 500 | 100 | $5.0\ 10^{-4}$ | 1.24 | $7.5\ 10^{-4}$ | 1.26 |
| 250 | 50 | | | $5.3\ 10^{-5}$ | 1.55 |

What is claimed is:

1. A process for the isotopic separation in a cell of a compound X having at least two isotopic forms, wherein the molecules of compound X are excited in the gaseous state, so as to bring about their dissociation, by means of a vibrational energy transfer between the molecules of compound X and the excited molecules of a compound A, in the gaseous state and having a dissociation energy higher than that of compound X, the densities of compounds X and A being below about $2 \times 10^{17}$ molecules /cm³, the vibrational transfer kinetics being different up to the dissociation of the molecules of compound X for the at least two isotopic forms to be separated under temperature conditions such that the thermal width of the vibrational energy levels involved in the vibrational energy transfer is at the most equal to the isotopic shift between the resonance energy levels of the at least two isotopic forms to be separated, and wherein the molecules of compound A are excited by an absorption of light emitted by a pulsed laser source, the duration, energy of the light pulses and irradiated section being such that the absorption time of the light by the molecules of the compound A is less than the excitation time of the molecules of compound X up to their dissociation.

2. A process according to claim 1, wherein the pulsed laser is a carbon dioxide laser.

3. A process according to claim 2, wherein compound A is chosen from the group consisting of sulphur hexafluoride, silicon tetrafluoride, boron trichloride and any other molecule with a high dissociation energy absorbing the energy levels of the carbon dioxide laser.

4. A process according to claim 1, wherein the duration of the light pulses at mid-height is below 500 nanoseconds.

5. A process according to claim 1, wherein the dissociation of compound X is increased by mixing therewith one or more compounds B, in order to intercept the free radicals or atoms and in this way prevent secondary reactions.

6. A process according to claim 1 wherein the gases are contained in a static state in said cell.

7. A process according to claim 1 wherein the gases traverse said cell in a dynamic state.

8. A process according to claim 1 wherein the cell is cooled.

9. A process according to claim 8 wherein said cell is cooled by means of a molecular jet.

* * * * *